United States Patent [19]

Van Tilburg

[11] Patent Number: 5,655,021
[45] Date of Patent: Aug. 5, 1997

[54] METHOD FOR CHECKING DATA SEQUENCES

[75] Inventor: Johan Van Tilburg, Zoetermeer, Netherlands

[73] Assignee: Koninklijke PTT Nederland N.V., Groningen, Netherlands

[21] Appl. No.: 504,530

[22] Filed: Jul. 20, 1995

[30] Foreign Application Priority Data

Jul. 29, 1994 [NL] Netherlands .................. 9401246

[51] Int. Cl.$^6$ .................. H04K 1/04; H04L 9/00
[52] U.S. Cl. .................. 380/37; 380/21; 380/43; 380/45
[58] Field of Search .................. 380/21, 37, 43, 380/45, 25

[56] References Cited

U.S. PATENT DOCUMENTS 4,074,066  2/1978  Ehrsam et al. .................. 380/37

OTHER PUBLICATIONS

B. Schneir; Applied Cryptography; John Wiley & Sons; 1993; pp. 157–160.
B. Schneir; Applied Cryptography, Second Edition; John Wiley & Sons; 1996; pp. 193–196.

*Primary Examiner*—Stephen C. Buczinski
*Attorney, Agent, or Firm*—Michaelson & Wallace; Peter L. Michaelson; John C. Pokotylo

[57] ABSTRACT

The invention relates to a method for checking data sequences, comprising a protection step and a verification step, with a control sequence being formed in the protection step on the basis of an identification sequence, which identification sequence comprises identification values which identify data sequences which are to be protected, and which control sequence comprises control values of which at least some have been formed on the basis of operation values, which operation values have been derived from data of sequences which were identified by the said identification values, and with the data sequences being verified, in the verification step, on the basis of the control values. In accordance with the invention control values are formed, successively, by combining an identification value with an operation value related to a preceding control value. The invention is especially useful for verifying data files.

23 Claims, 4 Drawing Sheets

METHOD FOR CHECKING DATA SEQUENCES

BACKGROUND OF THE INVENTION

The invention relates to a method for checking data sequences, comprising a protection step and a verification step, with a control sequence being formed in the protection step on the basis of an identification sequence, which identification sequence comprises identification values which identify the data sequences which are to be protected, and which control sequence comprises control values of which at least some have been formed on the basis of operation values, which operation values have been derived from data of sequences which were identified by the said identification values, and with the data sequences being verified, in the verification step, on the basis of the control values. Such a method is known in practise.

Identification values are used in such known methods to form operation values on the basis of data of corresponding sequences. In this context the sequences can for example be files, whereas the identification values can be the names or "identifiers" of said files. The operation values, which can for example be so-called hash values, can be incorporated as such or after a further operation (processing) into the control sequences (control file). In this context the control sequence (or verification sequence) acts as an addition to the data sequences. By comparing the values in the control sequence to values, which are directly obtained from the data sequences by carrying out a suitable operation, the integrity of the data sequences concerned can be checked.

In that context, however, it is also possible that third parties having at their disposal both the sequences themselves and the control file, can introduce changes in the sequences in a relatively simple manner if they can include said changes into the control file, since the control sequence (control file) comprises, with prior art methods, both the control values and the identification values. If the operation concerned is known, after all, a third party can also implement said operation and thus alter the control sequence, as a result of which alterations remain invisible. Furthermore, while both transferring identification values and control values, a relatively large amount of data has to be incorporated into the control sequence. Moreover, checking the sequences, with the prior art methods, takes a relatively large amount of time as the verification step has to be implemented each time for all data sequences with all the identification values and control values.

SUMMARY OF THE INVENTION

An object of the invention is to eliminate above-mentioned and other disadvantages of the prior art and to provide a method which provides a reliable verification of the integrity of data in a relatively simple manner. Furthermore, an object of the invention is to provide the possibility not to incorporate the identification values into the control file so that, as it were, the identification values are not visible to third parties, and the extent of the control sequence is restricted.

The method in accordance with the invention therefore is characterised in that the control values are successively formed by combining an identification value with an operation value related to a preceding identification value. Worded differently, the control words thus formed are mutually dependant since they are formed successively, every time on the basis of the preceding operation value. This has the advantage, that for third parties it has become far more difficult to change the control file in an unnoticed manner since the mutual dependency of the control values provides an additional protection. Through the mutual dependency, an early detection of changes and/or errors in data sequences is furthermore made possible by also implementing the control successively. Furthermore, the method in accordance with the invention offers the additional possibility of reconstructing a control sequence, also if a change or an error has been established, by additionally providing as yet in the prior art manner the identification values.

Preferably the method in accordance with the invention is implemented such that the control file does not comprise identification values. This has the advantage that the data sequences concerned cannot be identified by third parties right away and consequently cannot be changed. The identification values are, as it were, "invisible" to third parties. This both is advantageous if the control sequence is transferred on an information carrier and over a data connection (such as a transmission line). Moreover, by omitting the identification values, a reduction is obtained of the amount of data which is required for the control sequence. Said omitting the identification values is made possible by the above-mentioned mutual dependency of the control values.

Preferably a control value is formed on the basis of an initialisation value. That is to say, one of the control values of the control sequence is not based upon an identification value, but upon an initialisation value which can originate from outside the identification sequence. This is especially advantageous as operation value for the first identification value, which after all does not have the disposal of a preceding identification value for supplying an operation value.

The initialisation value can be a random number which is formed, for example, by a random number generator. Advantageously the initialisation value is, however, formed by operating upon a key word, such as an access word (pass word) of a computer system. In this context the key word can be operated upon in such manner that actually a random number is again created. In stead of a keyword, an authentication code can also be applied, as is used in enciphered data transport.

Advantageously the invention can be used in a method in which data sequences are being transferred from a first party to a second party, and with the initialisation value only being transferred after permission of the first party. Worded differently, first the data sequences can be transferred, for example on an information carrier (such as a diskette or a CD-ROM) or via a transmission line, and then the initialisation value is transferred, in the same or in a different manner, if the first party gives permission for doing so. The initialisation value, in this context, has possibly been incorporated into the control sequence but can also be transferred separately, with the control sequence for example already being transferred immediately before the data sequences or afterwards. The permission in this context may depend on having made a payment. In this manner, the initialisation value acts as a key for the data transferred.

Advantageously, a control value is formed on the basis of the operation values. In this context, the separate operation values can be combined successively, for example by adding (modulo 2). An additional protection is obtained if the result of combining is in each case subjected to a further operation.

REFERENCES

[1] H. Beker & F. Piper: "Cipher Systems", London 1982
[2] G. J. Simmons (ed.): "Contemporary Cryptology", New York 1992.

[3] P. Horowitz & W. Hill: "The Art of Electronics", Cambridge 1989.
[4] U.S. Pat. No. 4,864,616 (Pond et al.)
[5] U.S. Pat. No. 5,347,650 & EP 0 449 716 (Arditi et al.)
These references are herewith incorporated in this text.

BRIEF DESCRIPTION OF THE DRAWINGS

The invention will now be described more in detail on the basis of the Figures.

DETAILED DESCRIPTION OF PREFERRED EMBODIMENTS

Figure 1:
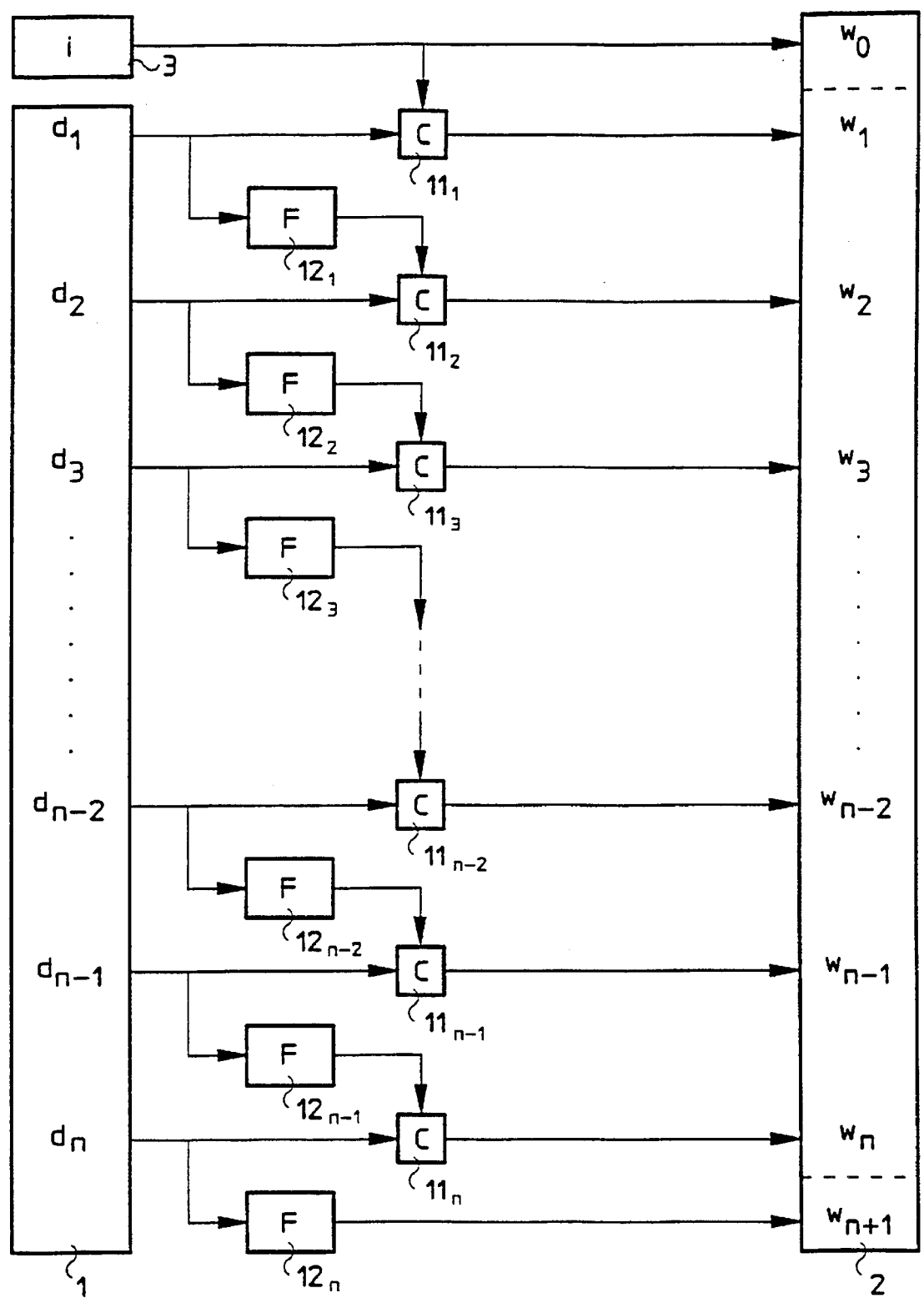
FIG. 1 diagrammatically shows protecting data in accordance with a first embodiment of the invention.

The protection step of the method in accordance with the invention, as diagrammatically represented in FIG. 1, comprises converting a first list with identifiers, such as names of files, into a second list. The first list (identification sequence) and the second list (control or verification sequence) can be files themselves.

The first list 1 comprises n identification values or identifiers d, designated by $d_1 \ldots d_2$, which are converted by the method into n control values (verification values) or identifiers $w_1 \ldots w_{n+1}$ of the second list 2. Moreover, the list 2, in the example represented, comprises an additional element $w_0$ which corresponds with an initialisation value i. The initialisation value i can originate from an additional list 3, but can also be generated while carrying out the method. Preferably the initialisation value i is a random value. Possibly the initialisation value i and the element $w_0$ can be omitted.

Characteristic for the method in accordance with the invention is the fact that the identifiers are operated upon successively, with use being made each time of the result of operating upon the preceding identifier. First, the initialisation value i is incorporated as $w_o$ into the second list 2. Then the identifier $d_1$ is combined at $11_1$ with the initialisation value i to form $w_1$. The combination-operation C, implemented in sub-step $11_1$, is a suitable operation of which an inverse operation, such as adding having as an inverse operation subtracting, is possible. Preferably the operation C is adding modulo 2, since this operation can be implemented in a very simple manner and is equal to its inverse operation, as a result of which possibly the same means can be used for the operation itself and its inverse.

The identifier $d_1$ is subjected to an operation F at $12_1$, in which operation a cryptographic value is determined on the basis of the data, which the identifier $d_1$ represents. If $d_1$ is the name of a file, on the basis of the content of the file a value is determined. In this context, techniques known per se can be used, such as techniques forming a so-called hash value. The value thus obtained is combined with $d_2$ at $11_2$ in order to form $w_2$. In a corresponding manner, in $12_2$, a cryptographic value is determined by the function F on the basis of the data, which are represented by $d_2$. The value found is used to form, in $11_3$, together with $d_3$, the value $w_3$.

In said manner, each time a value w is determined and added to the second list 2. Each value w, therefore is dependant of the corresponding value of d, of all the preceding values of d and of i, and of all data which are represented by the preceding values of d. It will be understood that a change in one or more of the data sequences, which are represented by the values of d, will cause a change in the values of w of the second list 2. On the basis of FIG. 2, it will be described how such changes can be detected during the verification step of the method.

Figure 2:
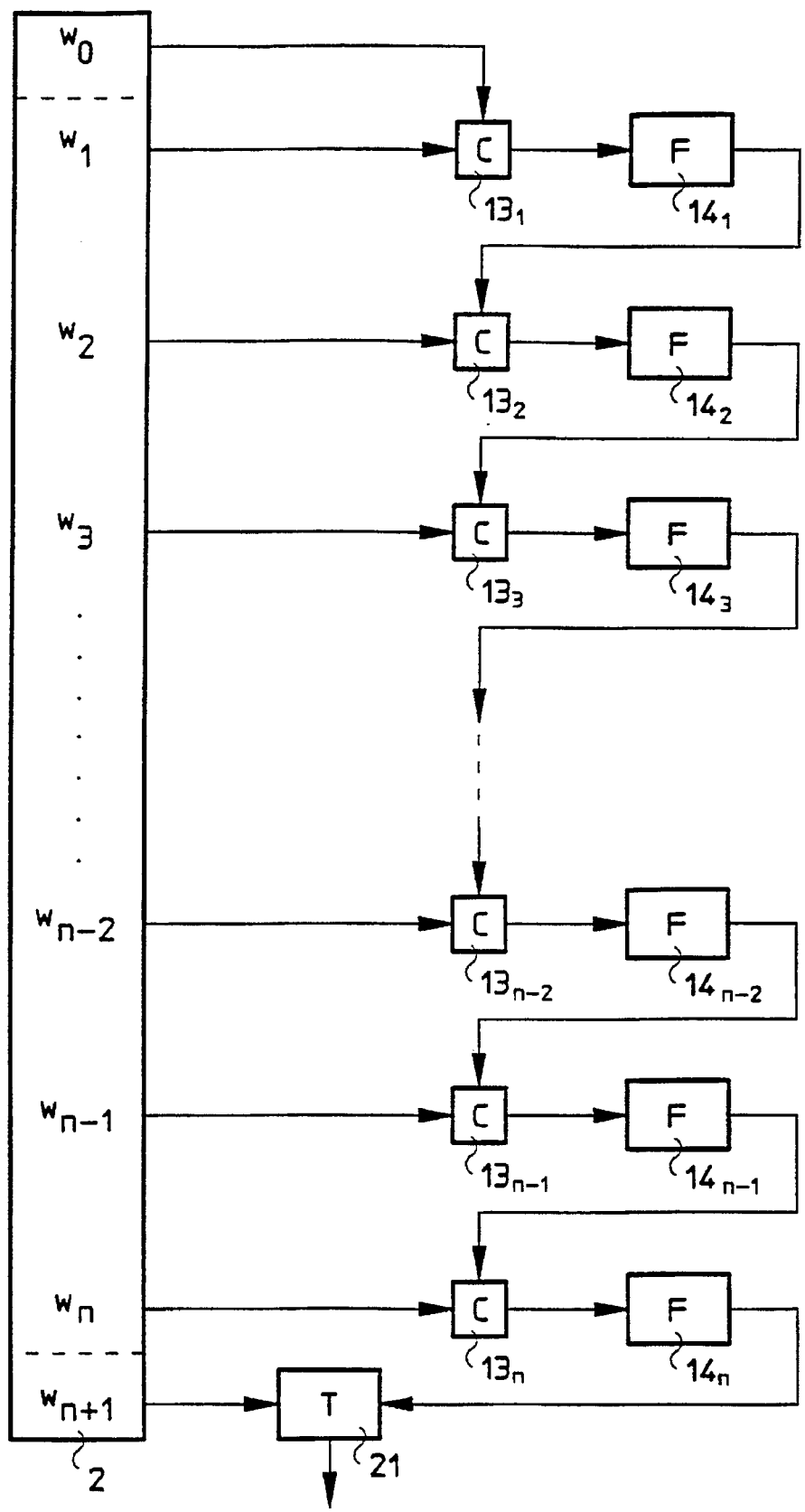
FIG. 2 diagrammatically shows verifying data in accordance with a first embodiment of the invention.

The verification step of the method in accordance with the invention, as diagrammatically represented in FIG. 2, comprises reading out the values w of the second list 2 and checking whether said values correspond to the corresponding data sequences.

In sub-step $13_1$, the value $w_1$ is combined with the value $w_0$ (initialisation value). The combination-operation C of sub-step $13_1$ is the inverse of that of sub-step $11_1$, so that the value of $d_1$ will be the result. If the operation C is equal to adding modulo 2, it can, with $w_0=i$, be described as follows: $w_1 \oplus w_0 = (d_1 \oplus i) \oplus i = d_1$. Said value of $d_1$ is added, in sub-step $14_1$, to a function F which can be the same function as in sub-step $12_1$. On the basis of the data represented by $d_1$, therefore a cryptographic value $F(d_1)$ is determined which is subsequently combined in the sub-step $13_2$ with the value $w_2$. If, in the protecting step, the data represented by $d_1$ is equal to the data represented in $d_1$, in the verification step, the cryptographic value found in sub-step $14_1$ is equal to the value determined in sub-step $12_1$, so that: $w_2 \oplus F(d_1) = d_2 \oplus F(d_1) \oplus F(d_1) = d_2$. On the basis of the value $d_2$, subsequently, in sub-step $14_2$ a cryptographic value $F(d_2)$ is determined which is combined with $w_3$ in sub-step $13_3$.

On the basis of the above it will be understood that a change of data will result in determining, in the sub-steps 14, the cryptographic values which do not correspond to the values d with which subsequent values w in the sub-steps 13 can be deciphered. As a result of this, it is firstly possible that at least some of the data sequences cannot be found, since the correct identifier d cannot be determined. Advantageously, the method in accordance with the invention is therefore implemented in such manner that an error message is immediately given as soon as a data sequence cannot be found, i.e. as soon as an identifier d proves not to be correct.

As appears from FIG. 2, the subsequent values of d are determined in sub-steps 13 by combining a value w with a value which is derived from the data corresponding to the preceding value of d. In this manner, it is ensured that the verification step can be interrupted when detecting an error, without first verifying all files sequences. Possibly the verification step can be continued by requesting one or more identification values d and, on the basis thereof, continuing the process.

Figure 3:
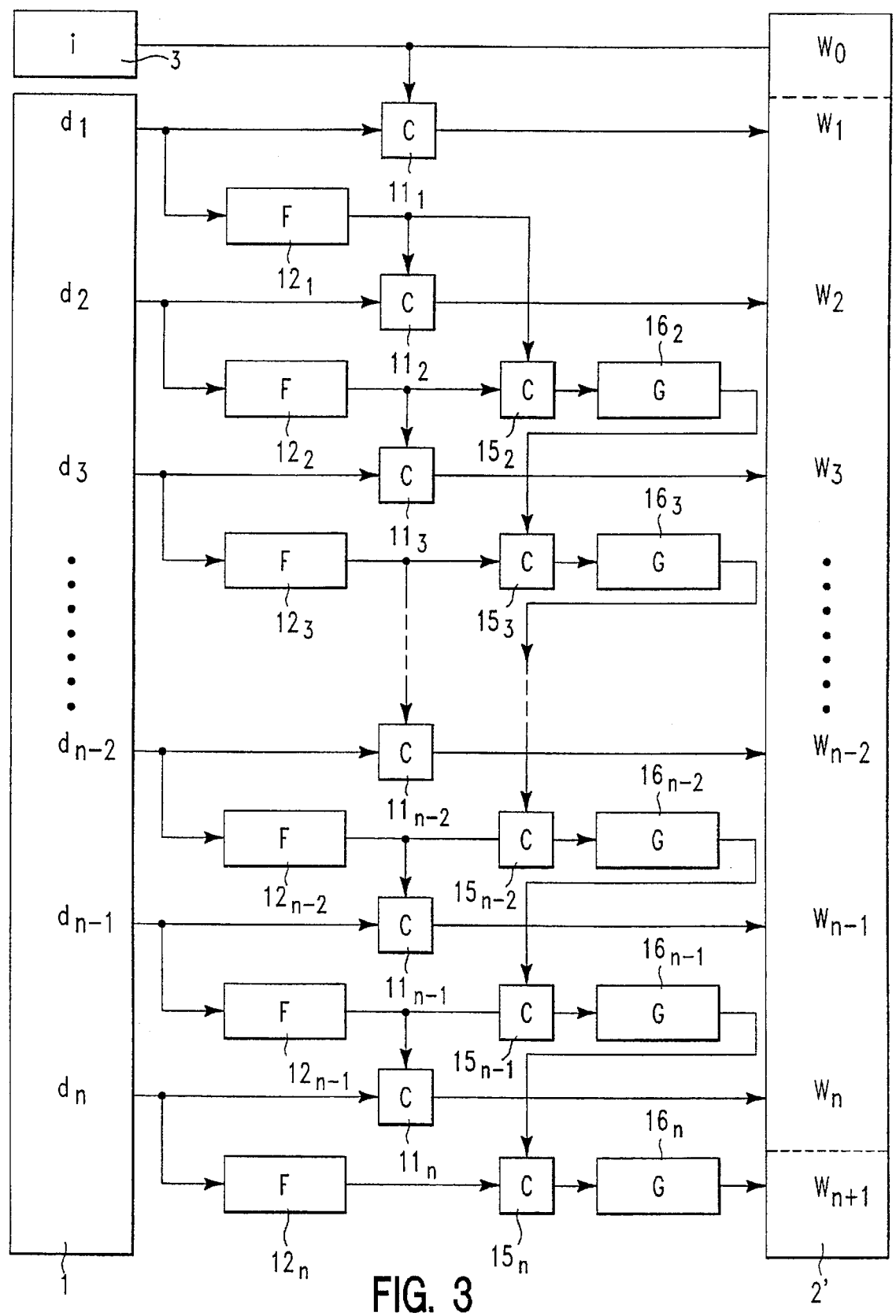
FIG. 3 diagrammatically shows protecting data in accordance with a second embodiment of the invention.

In FIG. 3, an extensive protection step is represented diagrammatically. The protection step of FIG. 3 comprises, in addition to that of FIG. 1, sub-steps 15 in which the cryptographic values (F(d)) found in the sub-steps 12 are combined with corresponding values, and sub-steps 16 in which, additional to the values obtained in the sub-steps 15, a cryptographic operation G is implemented. The result of said concatenation of operations is an additional key value $w_{n+1}$, which is added to the second list to form an extended second list 2'. The operations G can be arbitrary cryptographic operations, but are advantageously formed by so-called hash operations (possibly known per se). Such operations can be implemented in a relatively quick manner, so that the method is hardly delayed by said additional operations. Possibly, the operations G can be omitted, or only the last operation G in sub-step $16_{n-1}$ need be implemented to form the additional value $w_{n+1}$.

Figure 4:
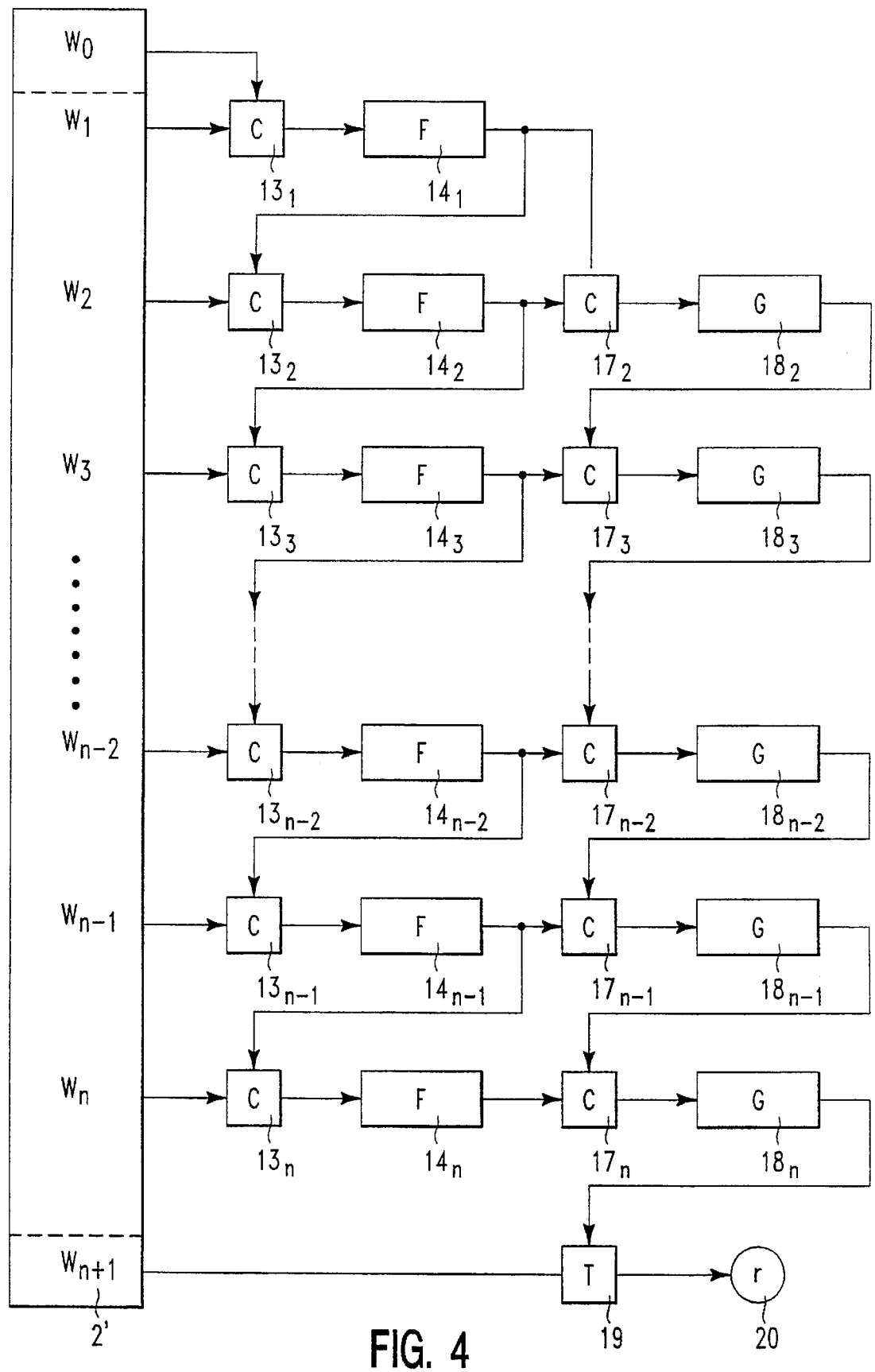
FIG. 4 diagrammatically shows verifying data in accordance with a second embodiment of the invention.

FIG. 4 diagrammatically shows a possible verification step in which the additional value $w_{n+1}$ is taken into account. In the verification step of FIG. 4 the result of each sub-step 14, is in each case combined in a sub-step 17 with the result of a preceding sub-step 14, after which the values thus obtained are supplied to a function G in respective sub-steps 18. In this context, the function G of the sub-steps 18 corresponds to the function G of the sub-steps 16 of FIG. 3, whereas the combination-operation of the sub-steps 17 is, in each case, the inverse of the corresponding sub-step 15 in FIG. 3. Preferably, the combination-operation of the sub-steps 15 and 17 is formed by adding modulo 2.

The result of each sub-step 18 is transferred to the next sub-step 17 and there, as was mentioned in the above, combined with the result of each sub-step 14. The result of the last sub-step 18, that is to say sub-step $18_n$, is tested against equality with the additional value $w_{n+1}$ in an operation T. If all data are correct, the value determined in sub-step $18_n$ must be equal to the value $w_{n+1}$. Inequality indicates an error or a change of the data. The result r of the test T is delivered in sub-step 20. In this manner, an additional verification of the data concerned is provided.

A device for implementing the method in accordance with the invention can be composed of components which are commercially available. Such a device can comprise a processor for implementing operations upon data, a memory for storing values and instructions, and input and output means for inputting and outputting, respectively, data. For realising such a device reference is made to, inter alia, reference [3]. Advantageously, such a device is at least partly incorporated in an application-specific integrated circuit (ASIC).

The invention can be applied in protecting files on information carriers, such as magnetic disks (diskettes, hard disks), magnetic tapes and optical information carriers. The method of the invention can especially be used in an advantageous manner when protecting installation diskettes which are used for installing programmes on hard disks. The method in accordance with the invention can also be employed advantageously when verifying information already stored on an information carrier (such as an hard disk). The invention can, however, also be used with data transport, for example by also transferring the second list in the form of a control file.

It will be understood by those skilled in the art that the invention is not restricted to the given exemplary embodiments and that many alterations and additions are possible without departing from the scope of the invention.

I claim:

1. Method for checking data sequences identified by identification values ($d_i$), said method comprising:
    (a) a protection step, said protection step comprising sub-steps of,
        (i) deriving an operation value ($F(d_i)$) by operating upon data of a data sequence identified by an identification value ($d_i$), and
        (ii) producing a next control value ($w_{i+1}$) by combining the operation value ($F(d_i)$) with a next identification value ($d_{i+1}$); and
    (b) a verification step, said verification step comprising sub-steps of
        i) combining a control value ($w_k$) with a previous operation value ($F(d_{k-1})$) to produce a current identification value ($d_k$), and
        ii) subjecting a data sequence corresponding with the current identification value ($d_k$) to an operation (F) to produce the current operation value ($F(d_k)$).

2. Method in accordance with claim 1, in which said control sequence comprises no identification values.

3. Method in accordance with claim 1, in which at least one control value is formed on the basis of an initialization value.

4. Method in accordance with claim 3, in which said initialization value is a random number.

5. Method in accordance with claim 3, in which said initialization value is formed by operating upon a code chosen from the group of a key code and an authentication code.

6. Method in accordance with claim 1, in which at least one control value is formed on the basis of a plurality of operation values.

7. Method in accordance with claim 1, in which forming an operation value comprises carrying out a hash operation.

8. Method in accordance with claim 1, in which 2 said sequences are stored on an information carrier.

9. Method in accordance with claim 1, in which said data sequences are verified by successively forming identification values by combining a control value with an operation value related to a preceding control value.

10. Method for checking data sequences, said method comprising:
    (a) a protection step, said protection step comprising sub-steps of,
        (i) deriving an operation value ($F(d_i)$) by operating upon data of a data sequence identified by an identification value, and
        (ii) producing a next control value ($w_{i+1}$) by combining the operation value ($F(d_i)$) with a next identification value ($d_{i+1}$),
        (iii) producing an additional control value on the basis of an initialization value, and
    (b) transferring said data sequences from a first party to a second party, said initialization value only being transferred after permission of the first party; and
    (c) a verification step, said verification step comprising sub-steps of
        i) combining a control value ($w_k$) with a previous operation value ($F(d_{k-1})$) to produce a current identification value ($d_k$),
        ii) subjecting a data sequence corresponding with the current identification value ($d_k$) to an operation (F) to produce the current operation value ($F(d_k)$), and
        iii) testing a last operation value using the additional control value.

11. Method in accordance with claim 10, in which said initialization value is a random number.

12. Method in accordance with claim 10, in which said initialization value is formed by operating upon a code chosen from the group of a key code and an authentication code.

13. Method in accordance with claim 10, in which at least one control value is formed on the basis of a plurality of operation values.

14. Method in accordance with claim 10, in which forming an operation value comprises carrying out a hash operation.

15. Method in accordance with claim 10, in which said sequences are stored on an information carrier.

16. Method in accordance with claim 10, in which said data sequences are verified by successively forming identification values by combining a control value with an operation value related to a preceding control value.

17. Method in accordance with claim 8 wherein the information carrier is a magnetic disk.

18. Method in accordance with claim 15 wherein the information carrier is a magnetic disk.

19. The method of claim 3 wherein the initialization value only affects a first one of the control values.

20. The method of claim 10 wherein the initialization value only affects a first one of the control values.

21. A method for generating a set of n verification values from a set of n identification values which identify data of a data sequence, the method comprising steps of:

a) determining an operation value ($F(d_{n-1})$) based on data of a data sequence identified by an identification value ($d_{n-1}$); and b) determining a next verification value ($w_n$) by combining the operation value ($F(d_{n-1})$) with a next identification value ($d_n$), such that each verification value can be determined without any preceding verification values.

22. The method of claim 21 further comprising steps of:

c) combining the operation value ($F(d_{n-1})$) with a previously generated value ($G_{n-1}$) to form an intermediate value; and d) determining a present generated value ($G_n$) by applying the intermediate value to a cryptographic operation (G).

23. The method of claim 22 wherein a last generated value ($G_{last}$) is used as an additional control value.

* * * * *